United States Patent
Ahokas et al.

(10) Patent No.: US 10,361,867 B2
(45) Date of Patent: Jul. 23, 2019

(54) VERIFICATION OF AUTHENTICITY OF A MAINTENANCE MEANS CONNECTED TO A CONTROLLER OF A PASSENGER TRANSPORTATION/ACCESS DEVICE OF A BUILDING AND PROVISION AND OBTAINMENT OF A LICENSE KEY FOR USE THEREIN

(71) Applicant: KONE Corporation, Helsinki (FI)

(72) Inventors: Sampo Ahokas, Hyvinkää (FI); Niko Elomaa, Hyvinkää (FI); Antti Hovi, Hyvinkää (FI); Ferenc Staengler, Hyvinkää (FI); Jani Kirmanen, Helsinki (FI); Mikko Niemelä, Helsinki (FI)

(73) Assignee: KONE CORPORATION, Helsinki (FI)

( * ) Notice: Subject to any disclaimer, the term of this patent is extended or adjusted under 35 U.S.C. 154(b) by 320 days.

(21) Appl. No.: 14/520,027

(22) Filed: Oct. 21, 2014

(65) Prior Publication Data
US 2016/0344554 A1 Nov. 24, 2016

(30) Foreign Application Priority Data
Oct. 29, 2013 (EP) .................... 13190632

(51) Int. Cl.
*H04L 9/32* (2006.01)
*G06F 21/44* (2013.01)
(Continued)

(52) U.S. Cl.
CPC ............ *H04L 9/3247* (2013.01); *G06F 21/44* (2013.01); *H04L 63/0435* (2013.01);
(Continued)

(58) Field of Classification Search
CPC ........ H04L 9/08; H04L 63/061; H04L 9/0844; H04L 63/0428; H04L 9/3247;
(Continued)

(56) References Cited

U.S. PATENT DOCUMENTS 7,574,607 B1 * 8/2009 Liu ................ H04L 9/3247
713/156
2003/0210786 A1 * 11/2003 Carr ................ G11C 16/22
380/241

(Continued)

FOREIGN PATENT DOCUMENTS

EP 2 634 957 A1 9/2013

OTHER PUBLICATIONS

Menezes et al., "Handbook of Applied Cryptography, Passage", Handbook of Applied Cryptography, CRC Press Series on Discrete Mathematices and Its Applications, CRC Press, Boca Raton, FL, US, XP002274761, Jan. 1, 1997, pp. 400-405; 506-514, 559-561.*

(Continued)

*Primary Examiner* — Farid Homayounmehr
*Assistant Examiner* — Sanchit K Sarker
(74) *Attorney, Agent, or Firm* — Birch, Stewart, Kolasch & Birch, LLP

(57) ABSTRACT

The invention allows verification of authenticity of a maintenance means connectable to a controller of a passenger transportation/access device of a building. A digitally signed license key including a public asymmetric cryptography key of the maintenance means and optionally a one-way hash of a unique identifier of the maintenance means is used for this verification. Furthermore, an asymmetric cryptography key pair of the maintenance means and a symmetric cryptography key created by the controller are utilized in this verification.

23 Claims, 2 Drawing Sheets

(51) Int. Cl.
*H04L 29/06* (2006.01)
*G07C 5/00* (2006.01)

(52) U.S. Cl.
CPC ........ *H04L 63/0442* (2013.01); *H04L 63/061* (2013.01); *G07C 5/008* (2013.01)

(58) Field of Classification Search
CPC ........... H04L 63/0435; H04L 63/0442; H04W 12/04; G06F 21/44; G07C 5/008
See application file for complete search history.

(56) References Cited

U.S. PATENT DOCUMENTS

| | | | | |
|---|---|---|---|---|
| 2004/0139329 | A1* | 7/2004 | Abdallah | H04L 9/3231 713/182 |
| 2005/0204141 | A1* | 9/2005 | Sayers | G06F 21/64 713/181 |
| 2008/0091947 | A1* | 4/2008 | Dancer | H04L 63/0442 713/171 |
| 2009/0094673 | A1* | 4/2009 | Seguin | G06F 21/51 726/1 |
| 2009/0169019 | A1* | 7/2009 | Bauchot | G06F 21/10 380/278 |
| 2010/0031024 | A1* | 2/2010 | Hayes | H04L 9/3247 713/156 |
| 2011/0072274 | A1* | 3/2011 | Leoutsarakos | H04L 63/0823 713/182 |
| 2011/0083161 | A1* | 4/2011 | Ishida | H04L 12/40 726/2 |
| 2013/0073859 | A1* | 3/2013 | Carlson | H04L 63/0823 713/176 |
| 2013/0290735 | A1* | 10/2013 | Rombouts | G06F 21/33 713/189 |
| 2014/0006785 | A1* | 1/2014 | Shaliv | H04L 9/088 713/170 |
| 2014/0211938 | A1* | 7/2014 | Campagna | H04L 9/3252 380/44 |
| 2016/0275276 | A1* | 9/2016 | Hovi | H04L 63/0823 |
| 2016/0344554 | A1* | 11/2016 | Ahokas | G06F 21/44 |

OTHER PUBLICATIONS

Menezes et al,, "Handbook of Applied Cryptography, Passage", Handbook of Applied Cryptography, CRC Press Series on Discrete Mathematices and Its Applications, CRC Press, Boca Raton, FL, US, XP002274761, Jan. 1, 1997, pp. 387-389, 400-405; 506-514, 559-561 (Year: 1997).*

Menezes etal,, "Handbook of Applied Cryptography, Passage", Handbook of Applied Cryptography, CRC Press Series on Discrete Mathematices and Its Applications, CRC Press, Boca Raton, FL, US, XP002274761, Jan. 1, 1997, pp. 387-389, 400-405; 506-514, 559-561 (Year: 1997) (Year: 1997).*

Menezes etal,, "Handbook of Applied Cryptography, Passage", Handbook of Applied Cryptography, CRC Press Series on Discrete Mathematices and Its Applications, CRC Press, Boca Raton, FL, US, XP002274761, Jan. 1, 1997, pp. 387-389, 400-405; 506-514, 559-561 (Year: 1997) (Year: 1997) (Year: 1997).*

Menezes et al., "Handbook of Applied Cryptography, Passage", Handbook of Applied Cryptography, CRC Press Series on Discrete Mathematices and Its Applications, CRC Press, Boca Raton, FL, US, XP002274761, Jan. 1, 1997, pp. 400-405.

* cited by examiner

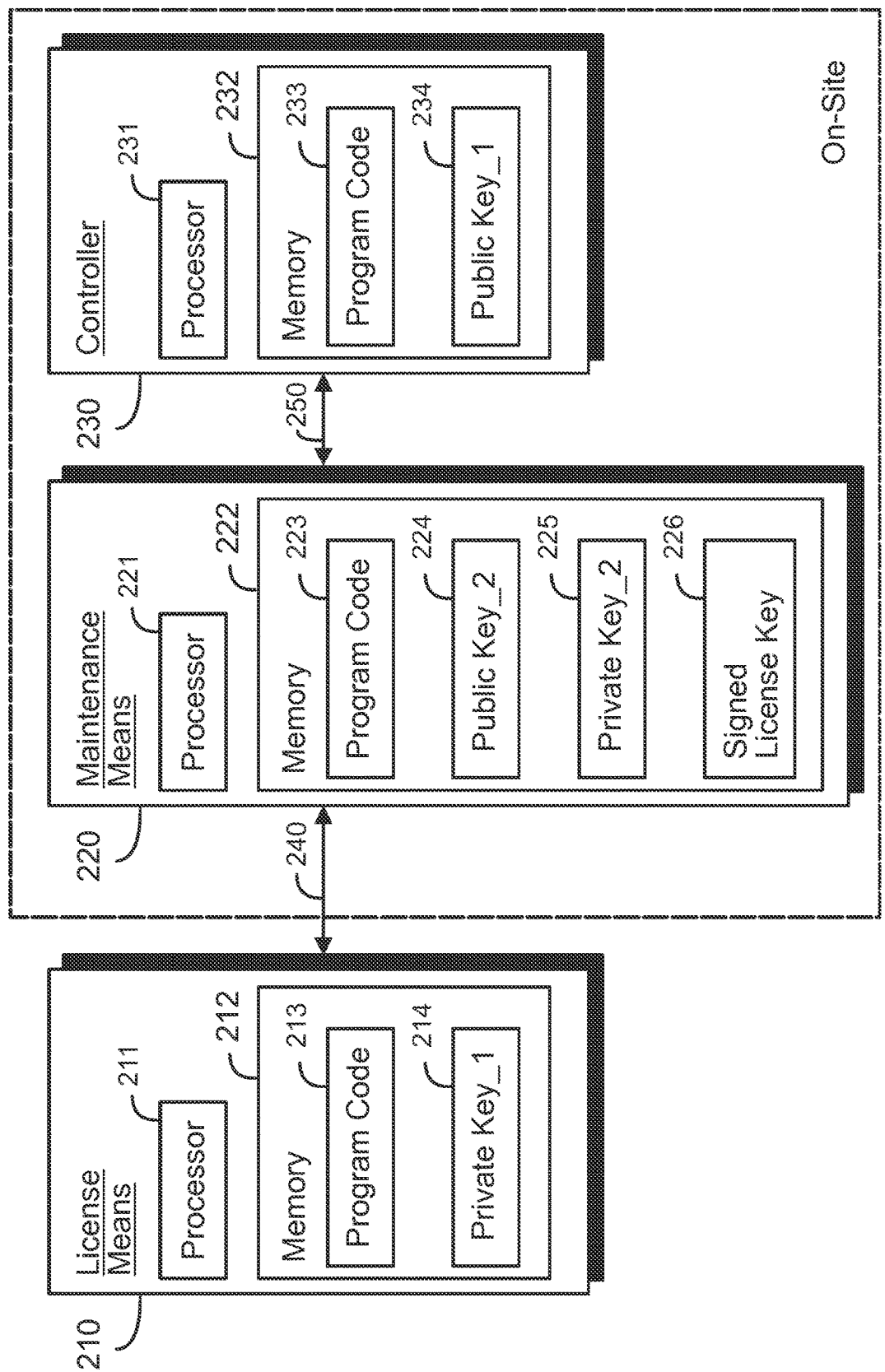

VERIFICATION OF AUTHENTICITY OF A MAINTENANCE MEANS CONNECTED TO A CONTROLLER OF A PASSENGER TRANSPORTATION/ACCESS DEVICE OF A BUILDING AND PROVISION AND OBTAINMENT OF A LICENSE KEY FOR USE THEREIN

BACKGROUND OF THE INVENTION

Field of the Invention

The invention relates passenger transportation/access devices of a building. In particular, the invention relates to verification of authenticity of a maintenance means connected to a controller of a passenger transportation/access device of a building. The invention further relates to provision and obtainment of a license key for use in this verification of authenticity.

Description of the Related Art

Modern passenger transportation/access devices (such as lifts/elevators, escalators, automatic doors, integrated access control systems, etc.) of a building typically have an electronic controller device associated with them that is configured to perform various control operations on its associated transportation/access device. Furthermore, a maintenance means is typically connectable to such a controller. The maintenance means is typically a portable device or application carried by a service person that is configured to perform various maintenance operations on the controller when connected to it. These maintenance operations may include e.g. routine status checks, diagnostics, configuration checks, software updates, and other similar operations.

Both the controller and the maintenance means (at least when connected to the controller) are located on-site, which means that they are exposed to onsite users. This provides an opportunity for a malicious third party to try to tamper with them. Accordingly, they must be secured. For this purpose, prior art utilizes various shared secret techniques and/or obfuscation techniques.

However, shared secrets must be included in both the controller and the maintenance means. Anyone with knowledge about the shared secrets and obfuscation techniques could create a new maintenance means without authorization by or knowledge of the passenger transportation/access device provider/operator. Compromise of the shared secrets and obfuscation techniques would destroy the security of such a passenger transportation/access device. Since both the controller and the maintenance means are located on-site, even the shared secrets and obfuscation techniques are still vulnerable to malicious activities, such as attempts to decipher the shared secrets.

Therefore, an object of the present invention is to alleviate the problems described above and to introduce a solution that allows verification of authenticity of a maintenance means connected to a controller of a passenger transportation/access device of a building.

SUMMARY OF THE INVENTION

A first aspect of the present invention is a method of obtaining verification of authenticity of a maintenance means connected to a controller of a passenger transportation/access device of a building. A digitally signed license key is received at the controller from the maintenance means. The digitally signed license key includes a public asymmetric cryptography key of the maintenance means and one of a unique identifier of the maintenance means and a one-way hash of the unique identifier of the maintenance means.

Verification of the validity of the digital signature of the received license key is attempted with a public asymmetric cryptography key of a predetermined license means. In response to the verification succeeding: the public asymmetric cryptography key of the maintenance means is extracted from the received license key, a symmetric cryptography key is generated, the generated symmetric cryptography key is encrypted with the extracted public asymmetric cryptography key of the maintenance means, and the encrypted symmetric cryptography key is sent to the maintenance means.

The unique identifier of the maintenance means is received in an encrypted form at the controller from the maintenance means. Decryption of the received encrypted unique identifier of the maintenance means is attempted with the generated symmetric cryptography key.

In response to the decryption succeeding and the received digitally signed license key including the one-way hash of the unique identifier of the maintenance means: a one-way hash of the decrypted unique identifier of the maintenance means is calculated with a predetermined one-way hash function. The received and calculated one-way hashes are compared with each other. In response to the received and calculated one-way hashes matching each other: it is determined that the authenticity of the maintenance means is now verified.

Alternatively, in response to the decryption succeeding and the received digitally signed license key including the unique identifier of the maintenance means: comparing the received and decrypted unique identifiers with each other, and in response to the received and decrypted unique identifiers matching each other: determining the authenticity of the maintenance means to be verified.

A second aspect of the present invention is a controller of a passenger transportation/access device of a building. The controller is connected to a maintenance means. The controller comprises at least one processor, and at least one memory including computer program code. The at least one memory and the computer program code are configured to, with the at least one processor, cause the controller at least to perform:

receiving a digitally signed license key from the maintenance means, the digitally signed license key including a public asymmetric cryptography key of the maintenance means and one of a unique identifier of the maintenance means and a one-way hash of the unique identifier of the maintenance means;

attempting to verify the validity of the digital signature of the received license key with a public asymmetric cryptography key of a predetermined license means;

in response to the verification succeeding: extracting the public asymmetric cryptography key of the maintenance means from the received license key, generating a symmetric cryptography key, encrypting the generated symmetric cryptography key with the extracted public asymmetric cryptography key of the maintenance means, and sending the encrypted symmetric cryptography key to the maintenance means;

receiving from the maintenance means the unique identifier of the maintenance means in an encrypted form;

attempting to decrypt the received encrypted unique identifier of the maintenance means with the generated symmetric cryptography key; and in response to the decryption succeeding and the received digitally signed license key including the one-way hash of the unique identifier of the maintenance means: calculating a one-way hash of the decrypted unique identifier of the maintenance means with a predetermined one-way hash function, comparing the received and calculated one-way hashes with each other, and in response to the received and calculated one-way hashes matching each other: determining the authenticity of the maintenance means to be verified; or in response to the decryption succeeding and the received digitally signed license key including the unique identifier of the maintenance means: comparing the received and decrypted unique identifiers with each other, and in response to the received and decrypted unique identifiers matching each other: determining the authenticity of the maintenance means to be verified.

A third aspect of the present invention is a method of providing verification of authenticity of a maintenance means connected to a controller of passenger transportation/access device of a building. A license key is sent from the maintenance means to the controller. The license key includes a public asymmetric cryptography key of the maintenance means and one of a unique identifier of the maintenance means and a one-way hash of the unique identifier of the maintenance means. The license key has been digitally signed by a predetermined license means with a private asymmetric cryptography key of the license means, and the one-way hash, when included, has been calculated by the license means.

An encrypted symmetric cryptography key is received at the maintenance means from the controller. The encrypted symmetric cryptography key has been generated by the controller and encrypted by the controller with the public asymmetric cryptography key of the maintenance means extracted from the sent license key. The received encrypted symmetric cryptography key is decrypted with a private asymmetric cryptography key of the maintenance means. The unique identifier of the maintenance means is encrypted with the decrypted symmetric cryptography key. The encrypted unique identifier of the maintenance means is sent from the maintenance means to the controller.

A fourth aspect of the present invention is a maintenance means connected to a controller of a passenger transportation/access device of a building. The maintenance means comprises at least one processor, and at least one memory including computer program code. The at least one memory and the computer program code are configured to, with the at least one processor, cause the maintenance means at least to perform:

sending to the controller a license key including a public asymmetric cryptography key of the maintenance means and one of a unique identifier of the maintenance means and a one-way hash of the unique identifier of the maintenance means, the license key digitally signed by a predetermined license means with a private asymmetric cryptography key of the license means and the one-way hash, when included, calculated by the license means;

receiving from the controller an encrypted symmetric cryptography key generated by the controller and encrypted by the controller with the public asymmetric cryptography key of the maintenance means extracted from the sent license key;

decrypting the received encrypted symmetric cryptography key with a private asymmetric cryptography key of the maintenance means;

encrypting the unique identifier of the maintenance means with the decrypted symmetric cryptography key; and sending the encrypted unique identifier of the maintenance means to the controller.

A fifth aspect of the present invention is a method of obtaining a license key for use in verification of authenticity of a maintenance means connectable to a controller of a passenger transportation/access device of a building. A request for the license key is sent from the maintenance means to a predetermined license means. The request includes a public asymmetric cryptography key of the maintenance means and optionally a unique identifier of the maintenance means. The requested license key is received at the maintenance means from the license means. The requested license key has been digitally signed by the license means with a private asymmetric cryptography key of the license means. The received license key includes at least the public asymmetric cryptography key of the maintenance means. If the request included the unique identifier of the maintenance means, the received license key further includes a one-way hash of the unique identifier of the maintenance means calculated by the license means.

A sixth aspect of the present invention is a maintenance means connectable to a controller of a passenger transportation/access device of a building. The maintenance means comprises at least one processor, and at least one memory including computer program code. The at least one memory and the computer program code are configured to, with the at least one processor, cause the maintenance means at least to perform:

sending to a predetermined license means a request for a license key for use in verification of authenticity of the maintenance means, the request including a public asymmetric cryptography key of the maintenance means and optionally a unique identifier of the maintenance means; and receiving from the license means the requested license key. The requested license key has been digitally signed by the license means with a private asymmetric cryptography key of the license means. The received license key includes at least the public asymmetric cryptography key of the maintenance means. If the request included the unique identifier of the maintenance means, the received license key further includes a one-way hash of the unique identifier of the maintenance means calculated by the license means.

A seventh aspect of the present invention is a method of providing a license key for use in verification of authenticity of a maintenance means connectable to a controller of a passenger transportation/access device of a building. A request for the license key is received at a predetermined license means from the maintenance means. The request includes a public asymmetric cryptography key of the maintenance means and optionally a unique identifier of the maintenance means.

If the received request included the unique identifier of the maintenance means, a one-way hash of the received unique identifier of the maintenance means is calculated with a predetermined one-way hash function.

The requested license key is generated, and it includes the received public asymmetric cryptography key of the maintenance means. If the received request included the unique identifier of the maintenance means, the generated license key further includes the calculated one-way hash of the unique identifier of the maintenance means. The generated license key is digitally signed with a private asymmetric cryptography key of the license means. Then, the digitally signed license key is sent from the license means to the maintenance means.

An eighth aspect of the present invention is a license means. The license means comprises at least one processor, and at least one memory including computer program code. The at least one memory and the computer program code are configured to, with the at least one processor, cause the license means at least to perform:

receiving, from a maintenance means connectable to a controller of a passenger transportation/access device of a building, a request for a license key for use in verification of authenticity of the maintenance means, the request including a public asymmetric cryptography key of the maintenance means and optionally a unique identifier of the maintenance means;

calculating a one-way hash of the received unique identifier of the maintenance means with a predetermined one-way hash function, if the received request included the unique identifier of the maintenance means;

generating the requested license key including the received public asymmetric cryptography key of the maintenance means. If the received request included the unique identifier of the maintenance means, the generated license key further includes the calculated one-way hash of the unique identifier of the maintenance means;

digitally signing the generated license key with a private asymmetric cryptography key of the license means; and sending the digitally signed license key to the maintenance means.

In an embodiment of the invention, the received digitally signed license key further includes an expiration date for the license key, and the first and second embodiment further comprise checking that the license key has not expired.

In an embodiment of the invention, the received digitally signed license key further includes authorization data defining at least one of operations and parameters allowed for the maintenance means.

In an embodiment of the invention, further communication between the controller and the maintenance means is secured with the symmetric cryptography key.

In an embodiment of the invention, a computer program stored on a computer readable medium comprises code adapted to cause the steps of any of the first, third, fifth and seventh embodiments when executed.

It is to be understood that the aspects and embodiments of the invention described above may be used in any combination with each other. Several of the aspects and embodiments may be combined together to form a further embodiment of the invention. A method, a controller, a maintenance means or a license means which is an aspect of the invention may comprise at least one of the embodiments of the invention described above.

The invention allows verification of authenticity of a maintenance means connected to a controller of a passenger transportation/access device of a building. The controller can reliably and securely determine whether the maintenance means is an authentic one approved by a recognized license means. The invention further allows relaying arbitrary data from the license means to the controller with the guarantee that the data has not been tampered with. The invention further allows establishing a secure communication channel between the controller and the maintenance means.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 2 is a block diagram illustrating apparatuses according to an embodiment of the present invention.

DETAILED DESCRIPTION OF THE PREFERRED EMBODIMENTS

Figure 1:
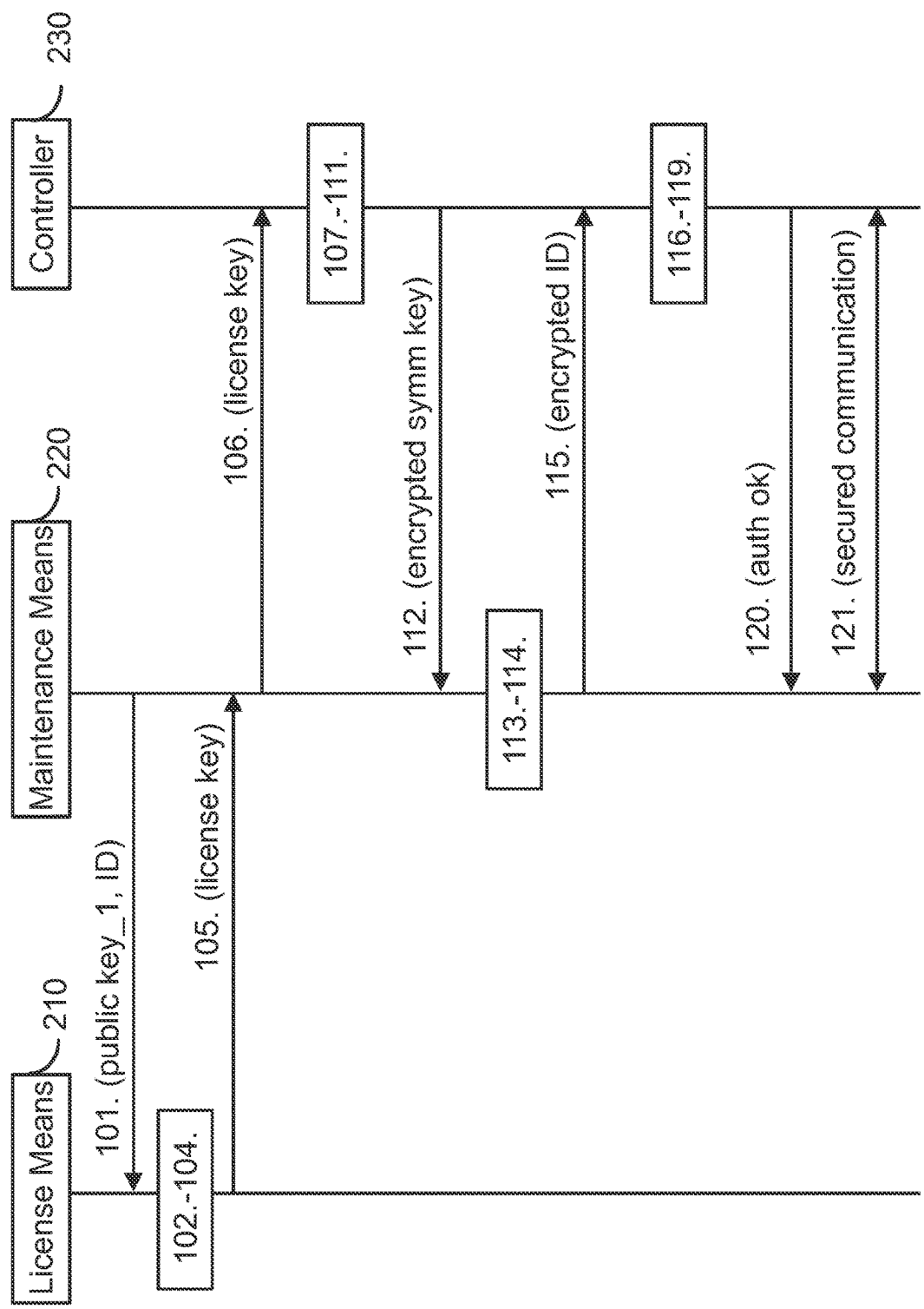
FIG. 1 is a signaling diagram illustrating methods according to an embodiment of the present invention.

Reference will now be made in detail to the embodiments of the invention, examples of which are illustrated in the accompanying drawings.

FIG. 1 is a signaling diagram illustrating methods according to an embodiment of the present invention.

At step 101, a request for a license key for use in verification of authenticity of a maintenance means 220 connectable to a controller 230 of a passenger transportation/access device of a building is sent from the maintenance means 220 to a predetermined license means 210. The request includes a public asymmetric cryptography key of the maintenance means and optionally a unique identifier of the maintenance means. The public asymmetric cryptography key is part of an asymmetric cryptography key pair of the maintenance means 220, a copy of which is stored at the maintenance means 220, as shown in FIG. 2. The other part of the asymmetric cryptography key pair of the maintenance means 220 is a corresponding private asymmetric cryptography key of the maintenance means 220, the only copy of which is securely stored at the maintenance means 220, as shown in FIG. 2. The unique identifier of the maintenance means 220 may include e.g. a serial number or the like of a hardware component of the maintenance means 220. The request for the license key is received at the predetermined license means from the maintenance means.

At optional step 102, a one-way hash of the received unique identifier of the maintenance means 220 is calculated with a predetermined one-way hash function, if the received request included the unique identifier of the maintenance means. At step 103, the requested license key is generated, and it includes the received public asymmetric cryptography key of the maintenance means 220. If the received request included the unique identifier of the maintenance means, the generated license key further includes the calculated one-way hash of the unique identifier of the maintenance means 220. At step 104, the generated license key is digitally signed with a private asymmetric cryptography key of the license means 210. This private asymmetric cryptography key is part of an asymmetric cryptography key pair of the license means 210, the only copy of which is securely stored at the license means 210, as shown in FIG. 2. The other part of the asymmetric cryptography key pair of the license means 210 is a corresponding public asymmetric cryptography key of the license means 210, a copy of which is securely stored at the controller 230, as shown in FIG. 2. Then, the digitally signed license key is sent from the license means 210 to the maintenance means 220, step 105, and the requested license key is received at the maintenance means 220. Accordingly, the received license key is unique to the specific maintenance means that requested it. The received license key is treated as a block of data by the maintenance means that requested it.

In the present example, the maintenance means is a portable device carried by a service person that is configured to perform various maintenance operations on the controller when connected to it. These maintenance operations may include e.g. routine status checks, diagnostics, configuration checks, software updates, and other similar operations. During steps 101-105, it is not necessary for the maintenance means 220 to be on-site or connected to the controller 230. The maintenance means 220 is connected to the controller 230 before step 106.

At step 106, the license key is sent from the maintenance means 220 to the controller 230. As discussed above, the license key includes the public asymmetric cryptography key of the maintenance means 220. The license key further includes either the unique identifier of the maintenance means 220 as-is, or a one-way hash of the unique identifier of the maintenance means 220 if the hash was calculated at optional step 102. The license key has been digitally signed by the license means 210 with the private asymmetric cryptography key of the license means 210, and the one-way hash, if included, has been calculated by the license means 210 at optional step 102, as discussed above. The digitally signed license key is received at the controller 230.

At step 107, verification of the validity of the digital signature of the received license key is attempted with a public asymmetric cryptography key of the license means 210. If the verification fails, the digital signature of the received license key is invalid, which means that the license key is corrupted or it has been tampered with. In such a case, the process of steps 108-121 is aborted.

The received digitally signed license key may optionally further include an expiration date for the license key. In such a case, at optional step 108 it may be checked that the license key has not expired. Normally, the process of steps 101-105 is performed once for a given maintenance means. However, if time-based licensing is utilized, the process of steps 101-105 may be performed to renew an expired license key.

Additionally/alternatively, the received digitally signed license key may optionally further include authorization data defining at least one of operations and parameters allowed for the maintenance means 220.

At step 109, in response to the verification succeeding: the public asymmetric cryptography key of the maintenance means 220 is extracted from the received license key. A symmetric cryptography key is generated, step 110. The generated symmetric cryptography key is encrypted with the extracted public asymmetric cryptography key of the maintenance means 220, step 111. Then, the encrypted symmetric cryptography key is sent to the maintenance means 220, step 112, and the encrypted symmetric cryptography key is received at the maintenance means 220.

At step 113, the received encrypted symmetric cryptography key is decrypted with a private asymmetric cryptography key of the maintenance means 220. The unique identifier of the maintenance means 220 is encrypted with the decrypted symmetric cryptography key, step 114. Then, the encrypted unique identifier of the maintenance means 220 is sent from the maintenance means 220 to the controller 230, step 115, and the unique identifier of the maintenance means 220 is received in the encrypted form at the controller 230.

At step 116, decryption of the received encrypted unique identifier of the maintenance means 220 is attempted with the generated symmetric cryptography key.

In response to the decryption succeeding and if the digitally signed license key received at step 106 included the one-way hash of the unique identifier of the maintenance means 220: a one-way hash of the decrypted unique identifier of the maintenance means is calculated with the same predetermined one-way hash function that the license means 210 used, step 117. The received and calculated one-way hashes are compared with each other, step 118a. If the received and calculated one-way hashes match each other, it is determined that the authenticity of the maintenance means 220 is now verified, step 119.

In response to the decryption succeeding and if the digitally signed license key received at step 106 included the unique identifier of the maintenance means 220 as-is: the received and decrypted unique identifiers are compared with each other, step 118b. If the received and decrypted unique identifiers match each other, it is determined that the authenticity of the maintenance means 220 is now verified, step 119.

Then, an authentication acknowledgement may optionally be sent to the maintenance means 220, step 120. After successful verification of the authenticity of the maintenance means 220, further communication between the controller 230 and the maintenance means 220 may be secured with the symmetric cryptography key generated in step 110. This further communication may be related to maintenance operations, such as routine status checks, diagnostics, configuration checks, software updates, and other similar operations.

FIG. 2 is a block diagram illustrating apparatuses according to an embodiment of the present invention. The apparatuses include a controller 230 of a passenger transportation/access device of a building, a maintenance means 220 connectable to the controller 230, and a license means 210.

The controller 230 comprises at least one processor 231, and at least one memory 232 including computer program code 233. The at least one memory 232 and the computer program code 233 are configured to, with the at least one processor 231, cause the controller 230 at least to perform: receiving a digitally signed license key 226 from the maintenance means 220, the digitally signed license key 226 including a public asymmetric cryptography key 224 of the maintenance means 220 and one of a unique identifier of the maintenance means 220 and a one-way hash of the unique identifier of the maintenance means 220; attempting to verify the validity of the digital signature of the received license key 226 with a public asymmetric cryptography key 234 of the license means 210; in response to the verification succeeding: extracting the public asymmetric cryptography key 224 of the maintenance means 220 from the received license key 226, generating a symmetric cryptography key, encrypting the generated symmetric cryptography key with the extracted public asymmetric cryptography key 224 of the maintenance means 220, and sending the encrypted symmetric cryptography key to the maintenance means 220; receiving from the maintenance means 220 the unique identifier of the maintenance means 220 in an encrypted form; attempting to decrypt the received encrypted unique identifier of the maintenance means 220 with the generated symmetric cryptography key; and in response to the decryption succeeding and the received digitally signed license key including the one-way hash of the unique identifier of the maintenance means (220): calculating a one-way hash of the decrypted unique identifier of the maintenance means 220 with a predetermined one-way hash function, comparing the received and calculated one-way hashes with each other, and in response to the received and calculated one-way hashes matching each other: determining the authenticity of the maintenance means (220) to be verified; or in response to the decryption succeeding and the received digitally signed license key including the unique identifier of the maintenance means: comparing the received and decrypted unique identifiers with each other, and in response to the received and decrypted unique identifiers matching each other: determining the authenticity of the maintenance means (220) to be verified.

The received digitally signed license key may optionally further include an expiration date for the license key. In such a case, the at least one memory 232 and the computer program code 233 are further configured to, with the at least one processor 231, cause the controller 230 to perform checking that the license key has not expired. Additionally/alternatively, the received digitally signed license key may further include authorization data defining at least one of operations and parameters allowed for the maintenance means 220.

Furthermore, the at least one memory 232 and the computer program code 233 may optionally be further configured to, with the at least one processor 231, cause the controller 230 to perform securing further communication with the maintenance means 220 with the generated symmetric cryptography key. As discussed above, this further communication may be related to maintenance operations, such as routine status checks, diagnostics, configuration checks, software updates, and other similar operations.

The maintenance means 220 comprises at least one processor 221, and at least one memory 222 including computer program code 223. The at least one memory 222 and the computer program code 223 are configured to, with the at least one processor 221, cause the maintenance means 220 at least to perform: sending to the controller 230 the license key 226 including the public asymmetric cryptography key 224 of the maintenance means 220 and one of a unique identifier of the maintenance means (220) and the one-way hash of the unique identifier of the maintenance means 220, the license key 226 digitally signed by the license means 210 with the private asymmetric cryptography key 214 of the license means 210 and the one-way hash, when included, calculated by the license means 210; receiving from the controller 230 the encrypted symmetric cryptography key generated by the controller 230 and encrypted by the controller 230 with the public asymmetric cryptography key 224 of the maintenance means 220 extracted from the sent license key 226; decrypting the received encrypted symmetric cryptography key with a private asymmetric cryptography key 225 of the maintenance means 220; encrypting the unique identifier of the maintenance means 220 with the decrypted symmetric cryptography key; and sending the encrypted unique identifier of the maintenance means 220 to the controller 230.

Furthermore, the at least one memory 222 and the computer program code 223 may be further configured to, with the at least one processor 221, cause the maintenance means 220 to perform securing further communication with the controller 230 with the decrypted symmetric cryptography key. As discussed above, this further communication may be related to maintenance operations, such as routine status checks, diagnostics, configuration checks, software updates, and other similar operations.

Additionally/alternatively, the at least one memory 222 and the computer program code 223 may be configured to, with the at least one processor 221, cause the maintenance means 220 at least to perform: sending to the license means 210 a request for a license key for use in verification of authenticity of the maintenance means 220, the request including the public asymmetric cryptography key 224 of the maintenance means 220 and optionally the unique identifier of the maintenance means 220; and receiving from the license means 210 the requested license key 226 digitally signed by the license means 210 with the private asymmetric cryptography key 214 of the license means 210, and the received license key 226 including the public asymmetric cryptography key 224 of the maintenance means 220 and, if the sent request included the unique identifier of the maintenance means 220, the one-way hash of the unique identifier of the maintenance means 220 calculated by the license means 210.

The license means 210 comprises at least one processor 211, and at least one memory 212 including computer program code 213. The at least one memory 212 and the computer program code 213 are configured to, with the at least one processor 211, cause the license means 210 at least to perform: receiving, from the maintenance means 220 connected to the controller 230 of a passenger transportation/access device of a building, a request for a license key for use in verification of authenticity of the maintenance means 220, the request including the public asymmetric cryptography key 224 of the maintenance means 220 and optionally the unique identifier of the maintenance means 220; if the received request included the unique identifier of the maintenance means 220: calculating the one-way hash of the received unique identifier of the maintenance means 220 with the predetermined one-way hash function; generating the requested license key including the received public asymmetric cryptography key 224 of the maintenance means 220 and, if the received request included the unique identifier of the maintenance means 220, the calculated one-way hash of the unique identifier of the maintenance means 220; digitally signing the generated license key with the private asymmetric cryptography key 214 of the license means 210; and sending the digitally signed license key 226 to the maintenance means 220.

In the embodiments of FIG. 1 and FIG. 2, the passenger transportation/access device (not shown in FIGS. 1 and 2) is one of a lift/elevator, an escalator, an automatic door, and an integrated access control system. The controller 230 is configured to perform various control operations on its associated passenger transportation/access device. The maintenance means 220 connectable to the controller 230 is configured to perform various maintenance operations on the controller 230. These maintenance operations may include e.g. routine status checks, diagnostics, configuration checks, software updates, and other similar operations. As shown in FIG. 2, the maintenance means 220 (when in use for the maintenance operations) and the controller 230 are located on-site with the associated passenger transportation/access device, whereas the license means 210 is remotely located. In an embodiment, the communication connection 240 between the license means 210 and the maintenance means 220 may utilize a World Wide Web based communication protocol. In an embodiment, the communication connection 250 between the maintenance means 220 and the controller 230 may utilize a proprietary protocol provided e.g. by the passenger transportation/access device provider/operator.

Furthermore, in the embodiments of FIG. 1 and FIG. 2, e.g. RSA may be used as the asymmetric cryptography algorithm, e.g. AES (Advanced Encryption Standard) may be used as the symmetric cryptography algorithm, and/or e.g. SHA-1 (Secure Hash Algorithm, SHA) may be used as the one-way hash function.

In the above-described embodiments of FIG. 1 and FIG. 2, if the one-way hash of the unique identifier of the maintenance means 220 calculated by the controller 230 in step 117 matches the one-way hash included in the license key received at step 106, or if the unique identifier of the maintenance means 220 received at step 106 matches the unique identifier of the maintenance means 220 decrypted by the controller 230 at step 116, it can be determined that the maintenance means 220 is an authentic one based on the following authentication factors:

1) License key: the maintenance means 220 has a valid license key 226 granted by the license means 210 because the verification of the digital signature succeeded;

2) Private key: the maintenance means 220 has a matching private key 225 for the public key 224 contained in the license key 226 because the maintenance means 220 was able to decrypt the encrypted symmetric key generated and sent by the controller 230; and 3) Identifier of the maintenance means 220: the maintenance means 220 is the legitimate owner of the license key 226 because it was able to supply a matching identifier to the controller 230. Further security is provided by the optional use of hashing: by storing a one-way hash of the identifier in the license key (instead of the identifier itself), the maintenance means 220 must be able to provide the original identifier used when granting the license key, i.e. the maintenance means 220 cannot extract the identifier from the license key. In particular, if a malicious third party tried to use a rogue maintenance means, it couldn't extract the identifier from the signed license key since the signed license key would include the one-way hash of the identifier instead of the identifier itself.

There is only one global secret (the private asymmetric cryptography key 214 of the license means 210) that is crucial to the security of the arrangement of the invention. Only the license means 210 needs to possess this secret. As a consequence, the secret can be stored in a well-protected location, and it never needs to be included in on-site devices.

Furthermore, devices that are exposed on-site (the maintenance means 220 and the controller 230) only need to store data that is required to protect that specific maintenance means or controller.

As a consequence, the arrangement/scheme of the invention is flexible so that the level of protection in maintenance means and controllers can be customized on a case by case basis. The strength of protection can be adjusted e.g. to achieve manufacturing cost savings without increasing the risk of compromising the crucial secrets.

The exemplary embodiments can include, for example, any suitable servers, workstations, PCs, laptop computers, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling ling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of obtaining verification of authenticity of a maintenance means configured to perform various operations connected to a controller performing control of a passenger transportation/access device of a building, comprising:

in a system where the maintenance means is provided with a digitally signed license key including a public asymmetric cryptography key of the maintenance means and one of a unique identifier of said maintenance means or a one-way hash of said unique identifier of said maintenance means, said license key being digitally signed/encrypted by a license means with a private asymmetric cryptography key of the license means, receiving, at said controller, said digitally signed license key from said maintenance means, said digitally signed license key including a public asymmetric cryptography key of said maintenance means and one of a unique identifier of said maintenance means or a one-way hash of said unique identifier of said maintenance means;

attempting to verify the validity of the digital signature of said received license key by decoding the received digitally signed license key of the predetermined license using a public asymmetric cryptography key of the license means;

in response to said verification succeeding: extracting the public asymmetric cryptography key of said maintenance means from the received license key, generating a symmetric cryptography key, encrypting the generated symmetric cryptography key with the extracted public asymmetric cryptography key of said maintenance means, and sending the encrypted symmetric cryptography key to said maintenance means;

receiving, at said controller from said maintenance means, the unique identifier of said maintenance means in an encrypted form;

attempting to decrypt the received encrypted unique identifier of said maintenance means with the generated symmetric cryptography key; and in response to said decryption succeeding and said received digitally signed license key including said one-way hash of said unique identifier of said maintenance means: calculating a one-way hash of the decrypted unique identifier of said maintenance means with a predetermined one-way hash function, comparing the received and calculated one-way hashes with each other, and in response to the received and calculated one-way hashes matching each other: determining the authenticity of said maintenance means to be verified; or in response to said decryption succeeding and said received digitally signed license key including said unique identifier of said maintenance means: comparing the received and decrypted unique identifiers with each other, and in response to the received and decrypted unique identifiers matching each other;

verifying the authenticity of said maintenance means and authorizing the maintenance means to perform operations on the controller.

2. The method according to claim 1, wherein the received digitally signed license key further includes an expiration date for the license key, and the method further comprises checking that the license key has not expired.

3. The method according to claim 1, wherein the received digitally signed license key further includes authorization data defining at least one of operations and parameters allowed for said maintenance means.

4. The method according to claim 1, further comprising securing further communication with said maintenance means with the generated symmetric cryptography key.

5. A controller of a passenger transportation/access device of a building, said controller being accessed by a maintenance means to perform maintenance operations on said controller, comprising:

at least one processor; and at least one memory including computer program code;

the at least one memory and the computer program code configured to, with the at least one processor, cause the controller at least to perform in a system wherein the maintenance means is provided with a digitally signed license key including a public asymmetric cryptography key of the maintenance means and one of a unique identifier of said maintenance means or a one-way hash of said unique identifier of said maintenance means, said license key being digitally signed/encrypted by a license means with a private asymmetric cryptography key of the license means:

receiving said digitally signed license key from said maintenance means, said digitally signed license key including a public asymmetric cryptography key of said maintenance means and one of a unique identifier of said maintenance means or a one-way hash of said unique identifier of said maintenance means;

attempting to verify the validity of the digital signature of said received license key by decoding the received digitally signed license key with a public asymmetric cryptography key the license means;

in response to said verification succeeding, extracting the public asymmetric cryptography key of said maintenance means from the received license key, generating a symmetric cryptography key, encrypting the generated symmetric cryptography key with the extracted public asymmetric cryptography key of said maintenance means, and sending the encrypted symmetric cryptography key to said maintenance means;

receiving from said maintenance means the unique identifier of said maintenance means in an encrypted form;

attempting to decrypt the received encrypted unique identifier of said maintenance means with the generated symmetric cryptography key; and in response to said decryption succeeding and said received digitally signed license key including said one-way hash of said unique identifier of said maintenance means, calculating a one-way hash of the decrypted unique identifier of said maintenance means with a predetermined one-way hash function, comparing the received and calculated one-way hashes with each other, and in response to the received and calculated one-way hashes matching each other:

determining the authenticity of said maintenance means to be verified; or in response to said decryption succeeding and said received digitally signed license key including said unique identifier of said maintenance means:

comparing the received and decrypted unique identifiers with each other, and in response to the received and decrypted unique identifiers matching each other:

verifying the authenticity of said maintenance means and authorizing the maintenance means to perform operations on the controller.

6. The controller according to claim 5, wherein the received digitally signed license key further includes an expiration date for the license key, and the at least one memory and the computer program code are further configured to, with the at least one processor, cause the controller to perform checking that the license key has not expired.

7. The controller according to claim 5, wherein the received digitally signed license key further includes authorization data defining at least one of operations and parameters allowed for said maintenance means.

8. The controller according to claim 5, wherein the at least one memory and the computer program code are further configured to, with the at least one processor, cause the controller to perform securing further communication with said maintenance means with the generated symmetric cryptography key.

9. A method of providing verification of authenticity of a maintenance means, comprising:

in a system wherein the maintenance means is provided with a digitally signed license key including a public asymmetric cryptography key of the maintenance means and one of a unique identifier of said maintenance means or a one-way hash of said unique identifier of said maintenance means, said license key being digitally signed/encrypted by a license means with a private asymmetric cryptography key of the license means, maintenance means being connected to a controller performing control of a passenger transportation/access device of a building, and configured to perform various operations thereon, sending, from said maintenance means to said controller, a license key including a public asymmetric cryptography key of said maintenance means and one of a unique identifier of said maintenance means or a one-way hash of said unique identifier of said maintenance means, the license key being digitally signed by a predetermined license means with a private asymmetric cryptography key of said license means and the one-way hash, when included, calculated by said license means;

receiving, at said maintenance means from said controller, an encrypted symmetric cryptography key generated by said controller and encrypted by said controller with the public asymmetric cryptography key of said maintenance means extracted from the sent license key;

decrypting the received encrypted symmetric cryptography key with a private asymmetric cryptography key of said maintenance means;

encrypting the unique identifier of said maintenance means with the decrypted symmetric cryptography key; and sending the encrypted unique identifier of said maintenance means from said maintenance means to said controller to verify the authenticity of said maintenance means and allow the maintenance means to perform operations on the controller.

10. The method according to claim 9, further comprising securing further communication with said controller with the decrypted symmetric cryptography key.

11. A computer program stored on a non-transitory computer readable medium for use in a method of providing verification of authenticity of a maintenance means, connected to a controller of passenger transportation/access device of a building, and configured to perform various operations thereon, the computer program, when implemented, performing the method comprising:

in a system wherein the maintenance means is provided with a digitally signed license key including a public asymmetric cryptography key of the maintenance means and one of a unique identifier of said maintenance means or a one-way hash of said unique identifier of said maintenance means, said license key being digitally signed/encrypted by a license means with a private asymmetric cryptography key of the license means comprising code adapted, when executed on said maintenance means, sending, from said maintenance means to said controller, a license key including a public asymmetric cryptography key of said maintenance means and one of a unique identifier of said maintenance means or a one-way hash of said unique identifier of said maintenance means, the license key being digitally signed by a predetermined license means with the private asymmetric cryptography key of said license means and the one-way hash, when included, calculated by said license means;

receiving, at said maintenance means from said controller, an encrypted symmetric cryptography key generated by said controller and encrypted by said controller with the public asymmetric cryptography key of said maintenance means extracted from the sent license key;

decrypting the received encrypted symmetric cryptography key with a private asymmetric cryptography key of said maintenance means;

encrypting the unique identifier of said maintenance means with the decrypted symmetric cryptography key; and sending the encrypted unique identifier of said maintenance means from said maintenance means to said controller to verify the authenticity of said maintenance means and authorize the maintenance means to perform operations on the controller.

12. A maintenance means connected to a controller performing control of a passenger transportation/access device of a building, comprising:
- at least one processor; and
- at least one memory including computer program code;
- the at least one memory and the computer program code configured to, with the at least one processor, cause the maintenance means at least to perform:
- in a system wherein the maintenance means is provided with a digitally signed license key including a public asymmetric cryptography key of the maintenance means and one of a unique identifier of said maintenance means or a one-way hash of said unique identifier of said maintenance means,
- said license key being digitally signed/encrypted by a license means with a private asymmetric cryptography key of the license means, and is configured to perform various operations of the controller;
- sending to said controller a license key including a public asymmetric cryptography key of said maintenance means and one of a unique identifier of said maintenance means or a one-way hash of said unique identifier of said maintenance means, the license, key digitally signed by a predetermined license means with a private asymmetric cryptography key of said license means and the one-way hash, when included, calculated by said license means;
- receiving from said controller an encrypted symmetric cryptography key generated by said controller and encrypted by said controller with the public asymmetric cryptography key of said maintenance means extracted from the sent license key;
- decrypting the received encrypted symmetric cryptography key with a private asymmetric cryptography key of said maintenance means;
- encrypting the unique identifier of said maintenance means with the decrypted symmetric cryptography key; and
- sending the encrypted unique identifier of said maintenance means to said controller to verify the authenticity of said maintenance means and cause the controller to authorize the maintenance means to perform operations on the controller.

13. The maintenance means according to claim 12, wherein the at least one memory and the computer program code are further configured to, with the at least one processor, cause the maintenance means to perform securing further communication with said controller with the decrypted symmetric cryptography key.

14. A method of obtaining a license key for use in verification of authenticity of a maintenance means, comprising:
- in a system wherein the maintenance means is provided with a digitally signed license key including a public asymmetric cryptography key of the maintenance means and one of a unique identifier of said maintenance means or a one-way hash of said unique identifier of said maintenance means,
- said license key being digitally signed/encrypted by a license means with a private asymmetric cryptography key of the license means, connectable to a controller performing control of a passenger transportation/access device of a building, and configured to perform various operations thereon,
- sending, from said maintenance means to a predetermined license means, a request for the license key of the predetermined license means, the request including a public asymmetric cryptography key of said maintenance means; and
- receiving, at said maintenance means from said license means, the requested license key digitally signed by said license means with a private asymmetric cryptography key of said license means, encrypted with the public asymmetric cryptography key of said maintenance means; and
- verifying the authenticity of said maintenance means and causing the controller to authorize the maintenance means to perform operations on the controller by providing the controller the key verifying the authenticity of the maintenance means decodable by the public asymmetric cryptography key of the license means.

15. The method according to claim 14, wherein the sent license key request further includes a unique identifier of said maintenance means and the received license key further includes a one-way hash of the unique identifier of said maintenance means calculated by said license means.

16. A computer program stored on a non-transitory computer readable medium for use in a method of verifying authenticity of a maintenance means connected to a controller of a passenger transportation/access device of a building, the computer program, when implemented, performing the method comprising:
- in a system wherein the maintenance means is provided with a digitally signed license key including a private asymmetric cryptography key of a predetermined license, the computer program comprising code adapted to cause, when executed on said maintenance means:
- sending, from said maintenance means to a predetermined license means, a request for the license key, the request including a public asymmetric cryptography key of said maintenance means; and
- receiving, at said maintenance means from said license means, the requested license key digitally signed by said license means with a private asymmetric cryptography key of said license means, the received license key including the public asymmetric cryptography key of said maintenance means; and
- sending, from the maintenance means to the controller the requested license key digitally signed by the license means to enable the controller to verify the authenticity of said maintenance means and the validity of the received license key by decoding the received digitally signed license key of the predetermined license using a public asymmetric cryptography key of the license means, thereby causing the controller to authorize the maintenance means to perform operations on the controller.

17. A maintenance means connectable to a controller performing control of a passenger transportation/access device of a building, comprising:
- at least one processor; and
- at least one memory including computer program code;
- the at least one memory and the computer program code configured to, with the at least one processor, cause the maintenance means at least to perform:
- in a system wherein the maintenance means is provided with a digitally signed license key including a private asymmetric cryptography key of a predetermined license, and is configured to perform various operations on the controller, sending to a predetermined license means a request for a license key for use in verification of authenticity of said maintenance means, the request including a public asymmetric cryptography key of said maintenance means; and receiving from said license means the requested license key digitally signed by said license means with a private asymmetric cryptography key of said predetermined license, the received license key including the public asymmetric cryptography key of said maintenance means; and sending, from the maintenance means to the controller the requested license key digitally signed by the license means to enable the controller to verify the authenticity of said maintenance means and the validity of the received license key by decoding the received digitally signed license key of the predetermined license using a public asymmetric cryptography key of the license means, thereby causing the controller to authorize the maintenance means to perform operations on the controller.

18. The maintenance means according to claim 17, wherein the sent license key request further includes a unique identifier of said maintenance means and the received license key further includes a one-way hash of the unique identifier of said maintenance means calculated by said license means.

19. A method of providing a license key to the maintenance means for use in verification of authenticity of a maintenance means, connectable to a controller and performing control of a passenger transportation/access device of a building, and configured to perform various operations thereon, comprising:

receiving, at a predetermined license means from said maintenance means, a request for the license key, the request including a public asymmetric cryptography key of said maintenance means;

generating the requested license key including the received public asymmetric cryptography key of said maintenance means;

digitally signing the generated license key with a private asymmetric cryptography key of said license means; and sending the digitally signed license key from said license means to said maintenance means; and wherein said maintenance means forwards the digitally signed license key to the controller to enable the controller to verify the authenticity of said maintenance means and the validity of the received license key by decoding the received digitally signed license key of the predetermined license using a public asymmetric cryptography key of the license means, thereby causing the controller to authorize the maintenance means to perform operations on the controller.

20. The method according to claim 19, wherein the received request for the license key further includes a unique identifier of said maintenance means; and the method further comprises:

calculating a one-way hash of the received unique identifier of said maintenance means with a predetermined one-way hash function; and wherein the step of generating further comprises including the calculated one-way hash of the unique identifier of said maintenance means in the license key.

21. A computer program stored on a non-transitory computer readable medium for use in a method of verifying authenticity of a maintenance means connected to a controller of a passenger transportation/access device of a building, and comprising code adapted, when executed on said license means, for:

receiving, at a predetermined license means, from said maintenance means, a request for the license key, the request including a public asymmetric cryptography key of said maintenance means;

generating the requested license key including the received public asymmetric cryptography key of said maintenance means;

digitally signing the generated license key with a private asymmetric cryptography key of said license means; and sending the digitally signed license key from said license means to said maintenance means; and wherein said maintenance means forwards the digitally signed license key to the controller to enable the controller to verify the authenticity of said maintenance means and the validity of the received license key by decoding the received digitally signed license key of the predetermined license using a public asymmetric cryptography key of the license means, thereby causing the controller to authorize the maintenance means to perform operations on the controller.

22. A license means providing a license key to a maintenance means, comprising:

at least one processor; and at least one memory including computer program code;

the at least one memory and the computer program code configured to, with the at least one processor, cause the license means at least to perform:

in a system wherein the maintenance means is provided with a license key digitally signed/encrypted by the license means with a private asymmetric cryptography key of the license means, the maintenance means connected to a controller performing control of a passenger transportation/access device of a building, and configured to perform various operations thereto, receiving, from a maintenance means connectable to a controller of a passenger transportation/access device of a building, a request for a license key for use in verification of authenticity of said maintenance means, the request including a public asymmetric cryptography key of said maintenance means;

generating the requested license key including the received public asymmetric cryptography key of said maintenance mean;

digitally signing the generated license key with a private asymmetric cryptography key of said license means; and sending the digitally signed license key to said maintenance means;

wherein said maintenance means forwards the digitally signed license key, to the controller to enable the controller to verify the authenticity of said maintenance means and the validity of the received license key by decoding the received digitally signed license key of the predetermined license using a public asymmetric cryptography key of the license means, thereby authorizing the maintenance means to perform operations on the controller.

23. The license means according to claim 22, wherein the received request for the license key further includes a unique identifier of said maintenance means; and the at least one memory and the computer program code are further configured to, with the at least one processor, cause the license means to perform: calculating a one-way hash of the received unique identifier of said maintenance means with a predetermined one-way hash function; and wherein the calculated one-way hash of the unique identifier of said maintenance means is included in the generated license key.

\* \* \* \* \*